US010121085B2

(12) United States Patent
Noma

(10) Patent No.: US 10,121,085 B2
(45) Date of Patent: Nov. 6, 2018

(54) INFORMATION PROCESSING APPARATUS AND METHOD OF SEARCHING FOR SIMILAR DATA

(71) Applicant: FUJITSU LIMITED, Kawasaki-shi, Kanagawa (JP)

(72) Inventor: Yui Noma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/425,129

(22) Filed: Feb. 6, 2017

(65) Prior Publication Data

US 2017/0262718 A1 Sep. 14, 2017

(30) Foreign Application Priority Data

Mar. 10, 2016 (JP) ................. 2016-046593

(51) Int. Cl.
| | | |
|---|---|---|
| *G06K 9/00* | (2006.01) | |
| *G06K 9/52* | (2006.01) | |
| *G06K 9/46* | (2006.01) | |
| *G06K 9/62* | (2006.01) | |
| *G06K 9/68* | (2006.01) | |

(52) U.S. Cl.
CPC ..... *G06K 9/00885* (2013.01); *G06K 9/00087* (2013.01); *G06K 9/4671* (2013.01); *G06K 9/52* (2013.01); *G06K 9/6218* (2013.01); *G06K 9/6255* (2013.01); *G06K 9/6807* (2013.01); *G06K 2009/00932* (2013.01)

(58) Field of Classification Search
CPC ... G06K 9/00; G06K 9/00221; G06K 9/00979
See application file for complete search history.

(56) References Cited

U.S. PATENT DOCUMENTS

2013/0262489 A1   10/2013   Shirakawa

FOREIGN PATENT DOCUMENTS

| JP | 2012-173793 | 9/2012 |
| JP | 2013-206187 | 10/2013 |
| JP | 2015-079101 | 4/2015 |

OTHER PUBLICATIONS

Antonio Torralba et al., "Small Codes and Large Image Databases for Recognition", 2008 IEEE Conference on Computer Vision and Pattern Recognition, Jun. 23-28, 2008 (10 pages).

*Primary Examiner* — Duy M Dang
(74) *Attorney, Agent, or Firm* — Fujitsu Patent Center

(57) ABSTRACT

An information processing apparatus stores first and second registered feature data respectively expressing first and second features of registered data, generates first and second subject feature data respectively expressing the first and second features of subject data, calculates a first degree of dissimilarity between the first registered feature data and the first subject feature data using a first computational process that exhibits symmetry so that a computational result does not change when two input values are interchanged, calculates a second degree of dissimilarity between the second registered feature data and the second subject feature data using a second computational process that exhibits antisymmetry so that a computational result changes when the two input values are interchanged, and selects the registered data based on the first and second degrees of dissimilarity.

6 Claims, 12 Drawing Sheets

101a

| TYPE | HYPERPLANE ID | NORMAL VECTOR | OFFSET | |
|---|---|---|---|---|
| SYMMETRIC COMPONENT | 101 | (12.0, −2.1, 7.4) | 0.1 | |
| | 102 | (−0.1, 1.1, −0.9) | 0.5 | n |
| | ⋮ | ⋮ | ⋮ | |
| ASYMMETRIC COMPONENT | 201 | (1.0, −4.1, 3.3) | 0.1 | |
| | 202 | (−5.0, 0.2, 1.1) | 0.3 | m |
| | ⋮ | ⋮ | ⋮ | |

| DATA ID | FEATURE VECTOR | BINARY DATA | |
|---|---|---|---|
| | | SYMMETRIC COMPONENT | ASYMMETRIC COMPONENT |
| 001 | (2.0, 4.1, 6.4) | (0, 1, 1, 0) | (0, 1, 1) |
| 002 | (24.2, 14.3, 96.6) | (0, 0, 1, 1) | (0, 1, 0) |
| 003 | (20.8, 6.6, 7.9) | (1, 1, 0, 0) | (1, 0, 0) |
| 004 | (120.8, 16.6, 17.9) | (1, 0, 1, 0) | (1, 1, 1) |
| ⋮ | ⋮ | ⋮ | ⋮ |

FIG. 5

INFORMATION PROCESSING APPARATUS AND METHOD OF SEARCHING FOR SIMILAR DATA

CROSS-REFERENCE TO RELATED APPLICATION

This application is based upon and claims the benefit of priority of the prior Japanese Patent Application No. 2016-046593, filed on Mar. 10, 2016, the entire contents of which are incorporated herein by reference.

FIELD

The embodiments discussed herein are related to an information processing apparatus and a method of searching for similar data.

BACKGROUND

A relational database (RDB) makes it possible to manage data in a structured manner. For this reason, data stored in an RDB is sometimes referred to as "structured data". On the other hand, text data produced by speech-to-text conversion of the content of a telephone conversation or a meeting, and audio data produced by recording those events is referred to as "unstructured data". Aside from text data and audio data, other examples of unstructured data include image data, and sensor data that has been outputted from various types of sensor. In recent years, attention has been focused on technologies that make effective use of unstructured data.

Similarity search technologies for unstructured data are useful when putting large amounts of unstructured data to use. As one example, when unstructured data that is similar to specified unstructured data that was collected in the past can be extracted from a large amount of present unstructured data, it becomes possible to perform time series analysis on unstructured data with a given feature. Similarity search technologies for unstructured data are used when matching patterns, such as fingerprints and veins, when performing personal authentication, and are also used when clustering and classifying unstructured data or when detecting unauthorized access to an information system.

An authentication system that provides a personal authentication service using fingerprint data performs authentication by searching a vast amount of fingerprint data collected from a large number of registered users for fingerprint data that is similar to inputted fingerprint data.

In a similarity search for unstructured data, a feature vector expressing a feature of the unstructured data is used. As one example, an authentication system calculates, as the degree of dissimilarity between fingerprint data, the Euclidean distance between pairs of feature vectors in a feature space and searches for fingerprint data corresponding to feature vectors with the smallest degree of dissimilarity.

The feature vectors generated from unstructured data such as fingerprint data are high-dimensional vectors with as many as ten to one thousand or so dimensions. Out of the processing relating to authentication, processing that specifies feature vectors with a small degree of dissimilarity has an especially high load. To reduce this load, a method that converts the feature vector to binary data of a specified length (a bit string of a predetermined length) and narrows the search to feature vectors with a small degree of dissimilarity based on the Hamming distance between the binary data strings has been proposed.

One method of converting a feature vector to binary data uses hyperplanes to bisect the feature space and decides each bit value according to which of the two partial spaces divided by a hyperplane the feature vector is positioned in. When N hyperplanes are used, N bits of binary data are obtained from one feature vector. Note that N is set at a sufficiently lower value than the number of dimensions of the feature vector.

As another method of converting a feature vector to binary data, a method that searches for neighborhood data (i.e., unstructured data with a small degree of dissimilarity) for the query data (i.e., the unstructured data used as a search key) has been proposed. As a method of improving the search precision, a method that searches for neighborhood data using a symbol string produced by inserting a wildcard symbol (i.e., a symbol that is determined to match regardless of whatever symbol is present at the same position in the data being compared) into binary data has been proposed.

A method that generates a feature value, which expresses digital data using a real number vector with D dimensions (where $D>0$), and generates a hash function based on relative geometric relationships in the proximity of the feature value has also been proposed.

Note that regarding the symmetry of a similarity-based relationship, a method that selects a favorable predictor based on an asymmetric similarity-based relationship has been proposed. With this method, feature representations of training clusters and a transformation matrix used to transform the feature representations are used to select a predictor. The transformation matrix maximizes, for a pair of training clusters, the asymmetric degree of similarity between the feature representation of one training cluster and the feature representation of the other training cluster after transformation. With this method, Kullback-Leibler Divergence (KLD) is used as the asymmetric degree of similarity.

See, for example, the following documents.
Japanese Laid-open Patent Publication No. 2013-206187
Japanese Laid-open Patent Publication No. 2012-173793
Japanese Laid-open Patent Publication No. 2015-079101
A. Torralba, R. Fergus, Y. Weiss, "Small codes and large image databases for recognition", 2008

By converting a high-dimensional feature vector to binary data and using the Hamming distance between binary data strings to narrow the selection of feature vectors to be searched and matched against a query, it is possible to speed up a similarity search for unstructured data. It is also possible to apply this technology to a similarity search for unstructured data in a variety of situations where high-speed processing is demanded, such as an authentication system that uses biometric data (which is unstructured data) like fingerprints, veins, or voiceprints.

However, when handling unstructured data, such as biometric data, that is easily affected by the collection environment, environment-based effects sometimes appear as errors in the similarity search. As examples, fingerprint data changes depending on how dry the environment is, while voiceprint data changes depending on factors like peripheral noise, humidity, and the state of the throat. When performing biometric authentication using image data, such as facial recognition or iris recognition, the image data is affected by changes in the skin due to physical condition, changes in expression due to mood, and lighting conditions.

Although it would be possible to suppress the effects caused by changes in environment by using feature vectors that do not include elements that are affected by environmental changes, it is currently difficult to find a suitable feature vector. Since it is assumed that elements in a feature vector will be affected by environmental changes, it would be desirable to develop a technology that suppresses the effect that environmental changes have on search precision.

SUMMARY

According to one aspect, there is provided an information processing apparatus including: a storage unit that stores therein first registered feature data expressing a first feature of registered data and second registered feature data expressing a second feature of the registered data; and a computational unit configured to perform a procedure including: generating first subject feature data expressing the first feature of subject data and second subject feature data expressing the second feature of the subject data; calculating a first degree of dissimilarity that is a degree of dissimilarity between the first registered feature data and the first subject feature data using a first computational process that calculates a degree of dissimilarity between two input values and exhibits symmetry so that a computational result does not change when the two input values are interchanged; calculating a second degree of dissimilarity that is a degree of dissimilarity between the second registered feature data and the second subject feature data using a second computational process that calculates a degree of dissimilarity between two input values and exhibits antisymmetry so that a computational result changes when the two input values are interchanged; and selecting the registered data based on the first degree of dissimilarity and the second degree of dissimilarity.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 depicts one example of hyperplane information according to the second embodiment;

FIG. 5 depicts one example of registered information according to the second embodiment;

DESCRIPTION OF EMBODIMENTS

Figure 1:
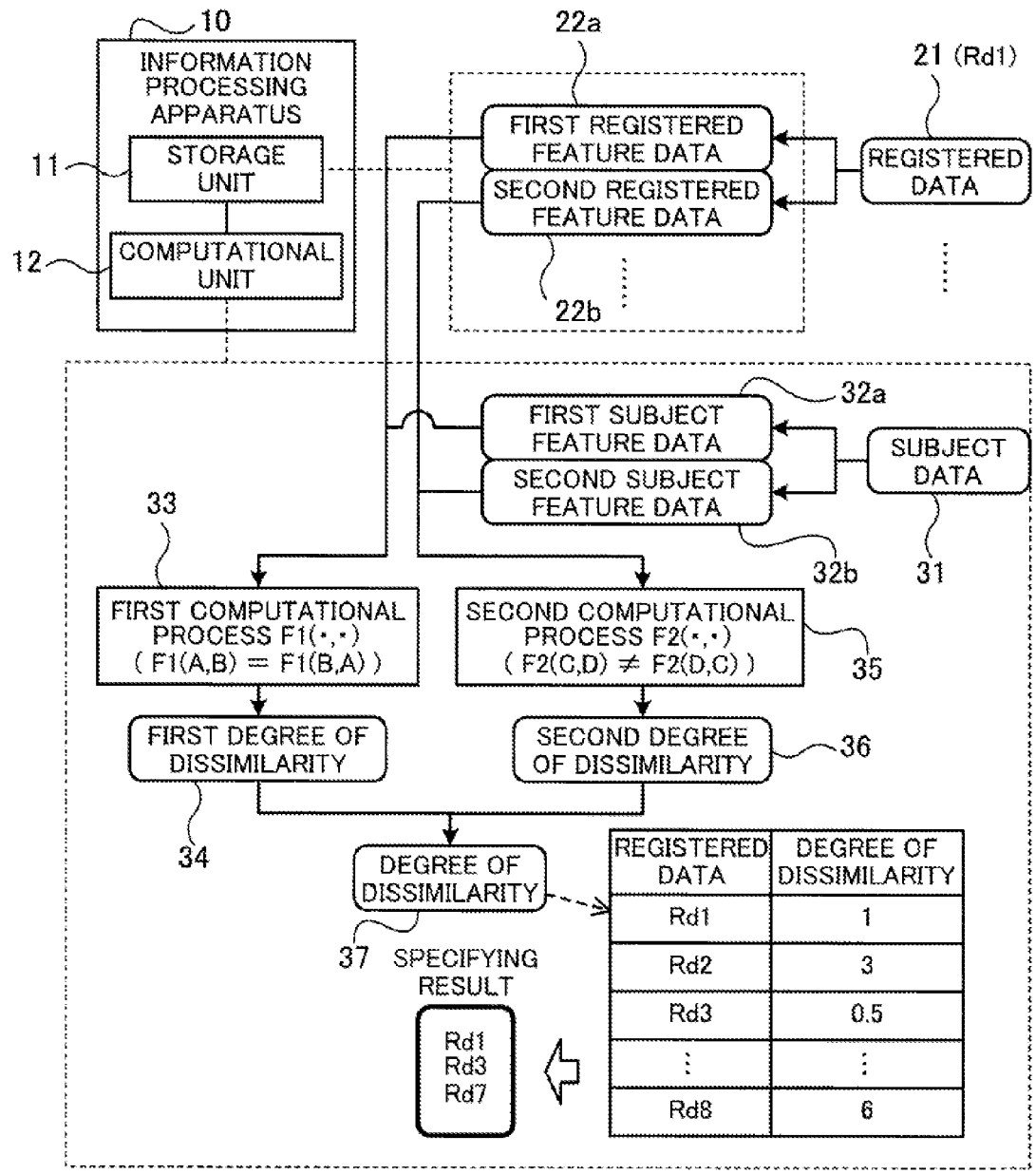
FIG. 1 depicts one example of an information processing apparatus according to a first embodiment.

Several embodiments will be described below with reference to the accompanying drawings, wherein like reference numerals refer to like elements throughout.

First Embodiment

A first embodiment will now be described with reference to FIG. 1. The first embodiment relates to a similarity search of unstructured data and discloses a technology for suppressing the effects of the collection environment of unstructured data on search results. FIG. depicts one example of an information processing apparatus according to the first embodiment. Note that the information processing apparatus 10 illustrated in FIG. 1 is merely one example of an information processing apparatus according to the first embodiment.

As depicted in FIG. 1, the information processing apparatus 10 includes a storage unit 11 and a computational unit 12. Note that the storage unit 11 is a volatile storage apparatus, such as RAM (Random Access Memory), or a nonvolatile storage apparatus, such as a hard disk drive (HDD) or flash memory. The computational unit 12 is a processor such as a CPU (Central Processing Unit) or a DSP (Digital Signal Processor). However, the computational unit 12 may be electronic circuitry, such as an ASIC (Application Specific Integrated Circuit) or an FPGA (Field Programmable Gate Array). As one example, the computational unit 12 executes programs stored in the storage unit 11 or another memory.

The storage unit 11 stores first registered feature data 22a expressing a first feature of registered data 21. The storage unit 11 also stores second registered feature data 22b expressing a second feature of the registered data 21.

As one example, the first registered feature data 22a is represented by a set of bit values (i.e., a binary data string) which are each decided according to which side of a hyperplane a feature vector of the registered data 21 is located on when a feature space in which the feature vector is defined is bisected by a set of hyperplanes. As examples, SIFT (Scale-Invariant Feature Transform), SURF (Speed-Upped Robust Feature), and ORB (ORiented-BRIEF) can be used as the feature vector.

The first feature can be represented using a set of hyperplanes. The set of hyperplanes that expresses the first feature is decided by a learning process that uses samples of a plurality of feature vectors. For example, the set of hyperplanes is decided so that for each of a plurality of samples, a group of other samples in the neighborhood of a subject sample and a group of binary data of other samples in the neighborhood of binary data decided from the subject sample match within a tolerated range. Note that when deciding the set of hyperplanes that represents the first feature, the distance (degree of dissimilarity) between binary data strings is calculated by a first computational process 33, described later.

The second registered feature data 22b is also expressed by a set of bit values (i.e., a binary data string) decided according to which side of a hyperplane the feature vector of the registered data 21 is located on when a feature space in which the feature vector is defined is bisected by a set of hyperplanes. Note that the second registered feature data 22b is obtained from the same feature vector as the first registered feature data 22a.

The second feature can be represented using a set of hyperplanes. The set of hyperplanes that expresses the second feature is decided by a learning process that uses samples of two types of feature vector. One type (or a "first type") of feature vector is a feature vector of data collected in the same environment (or "first environment") as original data corresponding to samples used when deciding the set of hyperplanes that express the first feature. The other type (or "second type") of feature vector is a feature vector of original data collected in a different environment (or "second environment") to the first environment.

The feature vector of original data collected in the first environment and the feature vector of original data collected in the second environment are used in a learning process as pairs of samples (or "feature pairs"). Note that although the original data is collected from the same source, the content of the original data will differ when the environment differs.

For fingerprint data as an example, even when fingerprints are collected from the same person, fingerprint data collected in an environment with normal humidity (or "original data collected in the first environment") and fingerprint data collected in a dry environment (or "original data collected in the second environment") have a different content.

The set of hyperplanes that represents the second feature is decided so that the two binary data strings corresponding to a feature pair are proximately positioned based on a degree of dissimilarity (distance) calculated by a second computational process 35, described later, and two binary data strings that do not correspond to a feature pair are not proximately positioned.

The computational unit 12 generates first subject feature data 32a that expresses a first feature of subject data 31. The subject data 31 is input data, such as fingerprint data, inputted for authentication purposes, for example. The computational unit 12 generates the first subject feature data 32a from the subject data 31 using the same method as the method that generates the first registered feature data 22a from the registered data 21. As one example, the computational unit 12 generates a feature vector from the subject data 31, and uses a set of hyperplanes that represent a first feature to generate the first subject feature data 32a from this feature vector.

The computational unit 12 generates second subject feature data 32b that expresses a second feature of the subject data 31. The computational unit 12 generates the second subject feature data 32b from the subject data 31 using the same method as the method that generates the second registered feature data 22b from the registered data 21. As one example, the computational unit 12 generates the second subject feature data 32b from a feature vector of the subject data 31 using a set of hyperplanes that represents a second feature. Note that information expressing the first and second features (for example information expressing sets of hyperplanes) is stored in advance in the storage unit 11.

The computational unit 12 calculates a first degree of dissimilarity 34 between the first registered feature data 22a and the first subject feature data 32a according to the first computational process 33 that calculates the degree of dissimilarity between two input values. The first computational process 33 is a symmetric computational process where the computational result does not change if the two input values are interchanged. For example, when the first computational process 33 is expressed as a function "F1" and the two input values are "A" and "B", the function F1 has a property (called "symmetry") such that "F1(A,B)=F1(B,A)". As one example, a computational process of the Hamming distance has the same property as the function F1.

The computational unit 12 also calculates a second degree of dissimilarity 36 between the second registered feature data 22b and the second subject feature data 32b according to a second computational process 35 that calculates the degree of dissimilarity between two input values. The second computational process 35 is an antisymmetric computational process where the computational result changes when the two input values are interchanged. For example, when the second computational process 35 is expressed as a function "F2" and the two input values are "C" and "D", the function F2 has a property (called "antisymmetry") such that "F2(C,D)≠F2(D,C)". As one example, when C and D are bit strings, the computational process that counts the number of ones included in a logical AND between C and an inverted value E produced by inverting D is antisymmetric.

Note that conditions relating to environments are set for both the first input value (that corresponds to C) and the second input value (that corresponds to D) of the second computational process 35. As one example, binary data corresponding to original data collected in the first environment mentioned earlier is inputted into the first input value and binary data corresponding to original data collected in the second environment mentioned earlier is inputted into the second input value. When the registered data 21 is data that was collected in the first environment, the second subject feature data 32b is treated as the first input value in the second computational process 35.

The computational unit 12 specifies the registered data 21 that is similar to the subject data 31 based on the first degree of dissimilarity 34 and the second degree of dissimilarity 36. As one example, the computational unit 12 sets the total of the first degree of dissimilarity 34 and the second degree of dissimilarity 36 as a degree of dissimilarity 37 between the subject data 31 and each set of registered data 21. The computational unit 12 compares the degree of dissimilarity 37 that has been calculated for various registered data (for example, Rd1, Rd2, . . . , Rd8) and specifies a predetermined number of sets of registered data (in the example in FIG. 1, Rd1, Rd3, and Rd7) in ascending order of the degree of dissimilarity 37.

As described above, the computational unit 12 evaluates the degree of dissimilarity using the second computational process 35 that is antisymmetric. This makes it possible to perform evaluation with consideration to effects due to changes in environment.

As one example, when the first degree of dissimilarity 34 between fingerprint data X1 (the registered data 21) collected in advance from a subject X in the first environment and fingerprint data Y2 (the subject data 31) collected from a subject Y in the second environment is low, there is a risk of Y being misidentified as X. However, although the second degree of dissimilarity 36 between X1 and Y2 will increase, the second degree of dissimilarity 36 between the fingerprint data Y1 (the registered data 21) collected in advance in the first environment from the subject Y and the fingerprint data Y2 decreases. This means that it is possible to suppress the risk of misidentification.

The first feature is set so that when first and second data collected in the same environment from the same subject are compared, the higher the degree of similarity between the first feature of the first data and the first feature of the second data, the lower the first degree of dissimilarity 34.

On the other hand, the second feature is set so that when third and fourth data collected in different environments from the same subject are compared, the higher the degree of similarity between the second feature of the third data and the second feature of the fourth data, the lower the second degree of dissimilarity 36. That is, the second feature represents the directionality of changes in a feature that occur in keeping with changes in environment. This means that by using the second degree of dissimilarity 36 together with the first degree of dissimilarity 34, it is possible to additionally take into account the directionality of feature changes caused by changes in environment, and therefore possible to suppress the risk of errors due to environmental factors.

This completes the description of the first embodiment.

Second Embodiment

Next, a second embodiment will be described. The second embodiment relates to a similarity search of unstructured data and discloses a technology for suppressing the effects of the collection environment of unstructured data on search results.

2-1. Hardware

Figure 2:
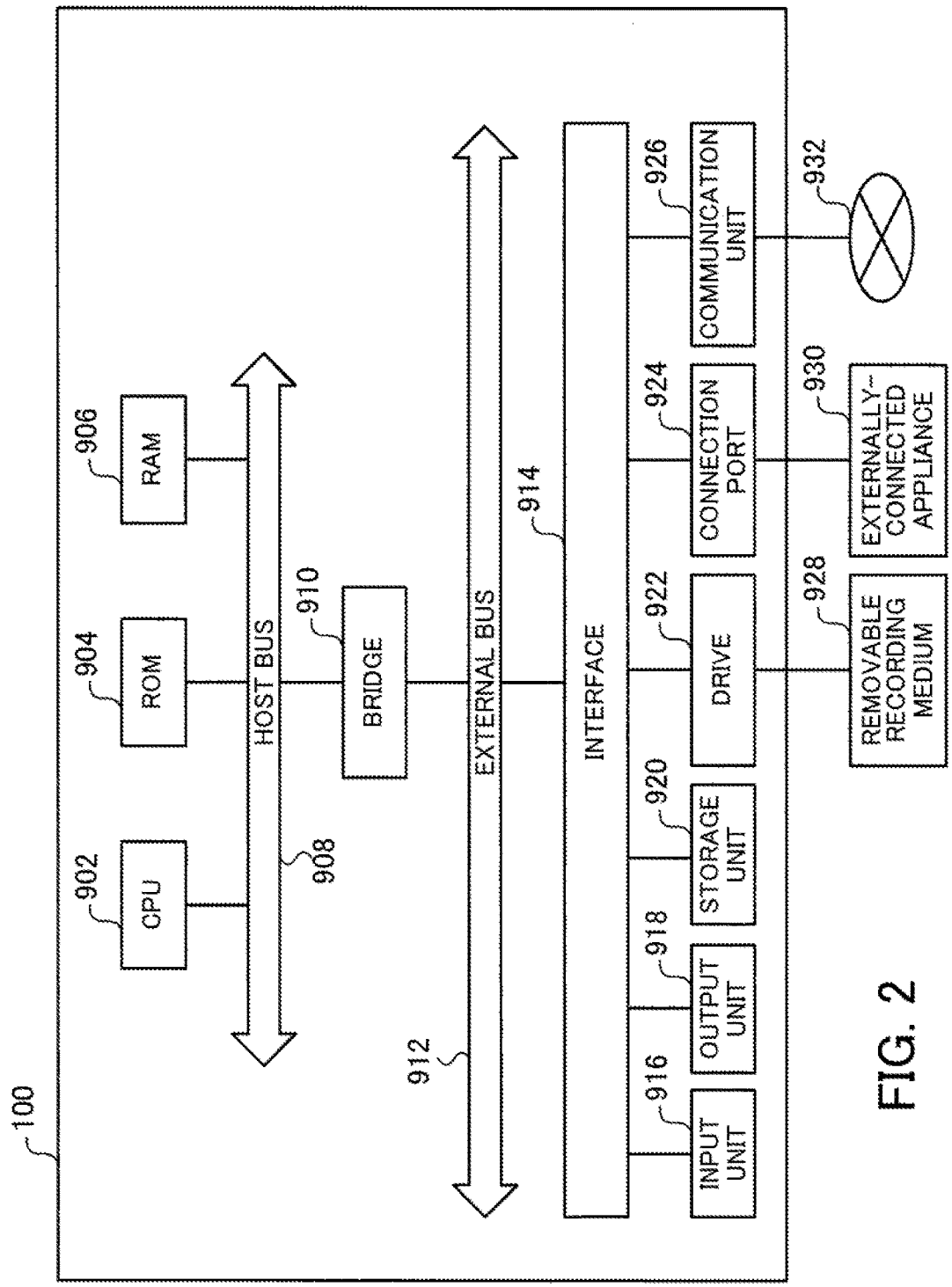
FIG. 2 depicts example hardware capable of realizing the functions of an information processing apparatus according to a second embodiment.

First, the hardware of an information processing apparatus 100 capable of realizing the technology according to the second embodiment will be described with reference to FIG. 2. FIG. 2 depicts example hardware capable of realizing the functions of an information processing apparatus according to the second embodiment. Note that the information processing apparatus 100 is merely one example of an information processing apparatus according to the second embodiment.

The functions of the information processing apparatus 100 can be realized using the hardware resources depicted in FIG. 2, for example. That is, the functions of the information processing apparatus 100 can be realized by controlling the hardware depicted in FIG. 2 using a computer program.

As depicted in FIG. 2, the hardware mainly includes a CPU 902, a ROM (Read Only Memory) 904, a RAM 906, a host bus 908, and a bridge 910. The hardware additionally includes an external bus 912, an interface 914, an input unit 916, an output unit 918, a storage unit 920, a drive 922, a connection port 924, and a communication unit 926.

The CPU 902 functions as a computational processing apparatus or control apparatus, for example, and controls all or part of the operations of the various component elements based on various programs recorded in the ROM 904, the RAM 906, the storage unit 920, or a removable recording medium 928. The ROM 904 is one example of a storage apparatus that stores programs to be loaded into the CPU 902, data used in computation, and the like. As examples, a program to be loaded into the CPU 902 and various parameters that change when the program is executed are temporarily or permanently stored in the RAM 906.

The above elements are connected to one another for example via the host bus 908 that is capable of high-speed data transfers. On the other hand, the host bus 908 is connected for example to the external bus 912 that is capable of transferring data at comparatively low speed via the bridge 910. As examples, a mouse, a keyboard, a touch panel, a touchpad, buttons, switches, levers, and the like are used as the input unit 916. It is also possible to use a remote controller capable of transmitting a control signal using infrared or other waves as the input unit 916.

As examples, a display apparatus such as a CRT (Cathode Ray Tube), an LCD (Liquid Crystal Display), a PDP (Plasma Display Panel), or an ELD (Electro-Luminescence Display) is used as the output unit 918. It is also possible to use other devices, such as an audio output apparatus like a speaker or headphones, or a printer, as the output unit 918. That is, the output unit 918 is any device capable of visually or audibly outputting information.

The storage unit 920 is an apparatus for storing various data. As one example, a magnetic storage device such as an HDD is used as the storage unit 920. As the storage unit 920, it is also possible to use a semiconductor storage device, such as an SSD (Solid State Drive) or a RAM disk, an optical storage device, a magneto-optical storage device, or the like.

The drive 922 is an apparatus that reads information recorded on the removable recording medium 928 and/or writes information onto the removable recording medium 928. As examples, a magnetic disk, an optical disc, a magneto-optical disc, or a semiconductor memory is used as the removable recording medium 928.

The connection port 924 is a port for connecting an externally-connected appliance 930, and as examples is a USB (Universal Serial Bus) port, an IEEE 1394 port, SCSI (Small Computer System Interface), an RS-232C port, or an optical audio jack. As one example, a printer is used as the externally-connected appliance 930.

The communication unit 926 is a communication device for connecting to a network 932. As examples, a communication circuit for a wired or wireless LAN (Local Area Network), a communication circuit for WUSB (Wireless USB), a communication circuit or router for optical communication, a communication circuit and/or router for ADSL (Asymmetric Digital Subscriber Line) and a communication circuit and/or router for a mobile telephone network is/are used as the communication unit 926. The network 932 connected to the communication unit 926 is a network with wired or wireless connections and as examples includes the Internet, a LAN, a broadcast network, and a satellite communication line.

This completes the description of the hardware of the information processing apparatus 100.

2-2. Functions

Figure 3:
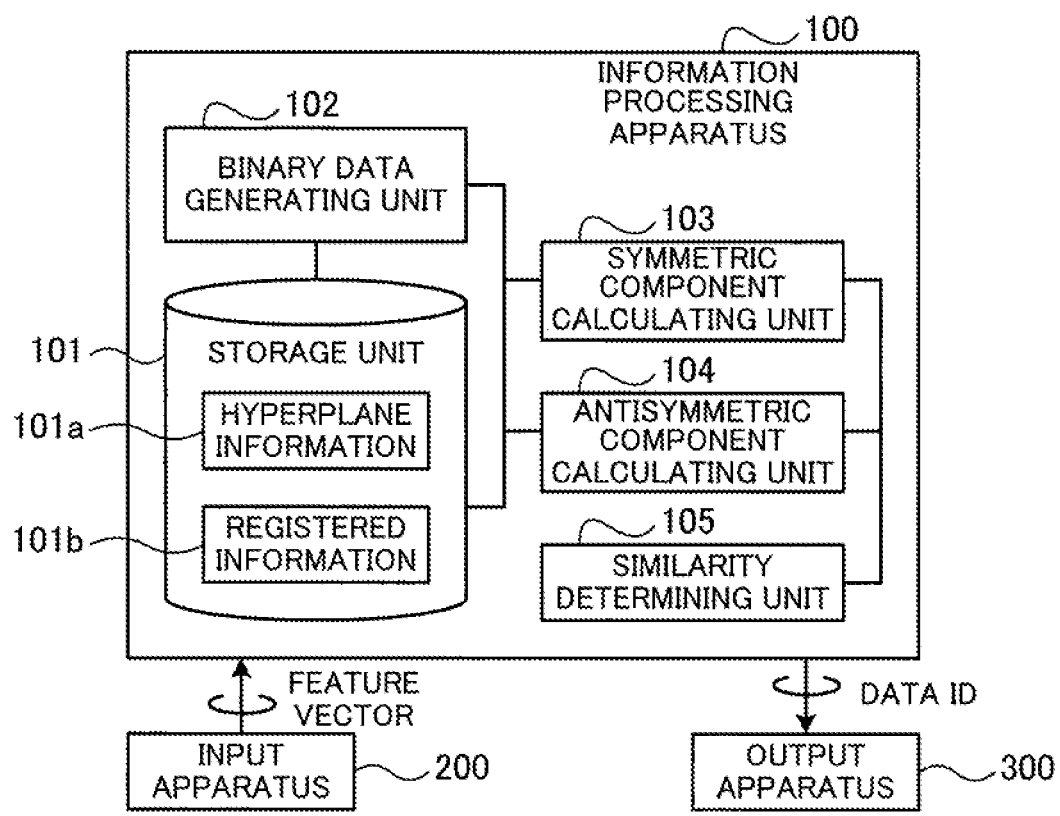
FIG. 3 is a block diagram depicting one example of the functions of the information processing apparatus according to the second embodiment.

Next, the functions of the information processing apparatus 100 will be described with reference to FIG. 3. FIG. 3 is a block diagram depicting one example of the functions of the information processing apparatus according to the second embodiment.

As depicted in FIG. 3, the information processing apparatus 100 includes a storage unit 101, a binary data generating unit 102, a symmetric component calculating unit 103, an antisymmetric component calculating unit 104, and a similarity determining unit 105.

The functions of the storage unit 101 can be realized using the RAM 906, the storage unit 920, and the like described above. The functions of the binary data generating unit 102, the symmetric component calculating unit 103, the antisymmetric component calculating unit 104, and the similarity determining unit 105 can be realized using the CPU 902 or the like described earlier.

Hyperplane information 101a and registered information 101b are stored in the storage unit 101. The hyperplane information 101a is information relating to sets of hyperplanes used to convert a feature vector to binary data. The registered information 101b is information relating to feature vectors (or "records") registered in advance in order to be matched against an inputted feature vector (or "query").

As depicted in FIG. 4, the hyperplane information 101a includes a type of binary data to be generated from a feature vector, identification information (hyperplane IDs) for identifying hyperplanes, and normal vectors and offsets for defining hyperplanes in a feature space. FIG. 4 depicts one example of hyperplane information according to the second embodiment.

The types of binary data include "symmetric component" and "antisymmetric component". The expression "symmetric component" refers to a component of the degree of dissimilarity that satisfies the axiom of distance, out of the degree of dissimilarity between feature vectors. As one example, the Euclidean distance between feature vectors is a component of the degree of dissimilarity that satisfies the axiom of distance. On the other hand, the expression "antisymmetric component" refers to a component of the degree of dissimilarity that satisfies the axiom of quasi-distance.

When a function dQ is quasi-distance, the function dQ satisfies an axiom (the "axiom of quasi-distance") represented by Expression (1) to Expression (3) below in a group W that has a point in a given space as an origin. Note that x, y, z∈W.

$$dQ(x,y) \geq 0 \quad (1)$$

$$dQ(x,y)=0 \text{ when } x=y \quad (2)$$

$$dQ(x,y) \leq dQ(x,z)+dQ(z,y) \quad (3)$$

As one example, the quasi-distance is an index that expresses a distance that takes into consideration the cost of movement, just as the distance experienced by people when coming and going between a house up on a mountain and a station down in the valley will differ according to the direction of travel. That is, the quasi-distance can be said to be a distance where the cost of movement due to wind, gravity, and the like is considered. In this way, a property whereby the distance (quasi-distance) differs according to the direction of movement is called "antisymmetry".

The hyperplane IDs included in the hyperplane information 101a are identification information for identifying hyperplanes. The normal vectors are vectors that are orientated in a direction perpendicular to a hyperplane in the feature space. Note that each normal vector may be normalized to a length of 1. The offsets are the distances (Euclidean distances) from the origin of the feature space to a hyperplane. A pair of a normal vector and an offset defines a hyperplane in the feature space (see FIG. 6). In the example in FIG. 4, n hyperplanes for generating binary data used in calculating the symmetric component and m hyperplanes for generating binary data used in calculating the antisymmetric component were set. Note that n and m may be equal.

As depicted in FIG. 5, the registered information 101b includes identification information (data IDs) for identifying sets of registered unstructured data, feature vectors extracted from the unstructured data, and binary data generated from the feature vectors. FIG. 5 depicts one example of registered information according to the second embodiment.

As one example, a feature vector is a vector in the feature space obtained by subjecting unstructured data to SIFT, SURF, or ORB, for example. Binary data is provided for calculation of the symmetric component and calculation of the antisymmetric component. The binary data provided for calculating the symmetric component is obtained from a feature vector using the hyperplanes whose type is "symmetric component" (see FIG. 4). On the other hand, binary data provided for calculating the antisymmetric component is obtained from a feature vector using the hyperplanes whose type is "antisymmetric component".

Figure 6:
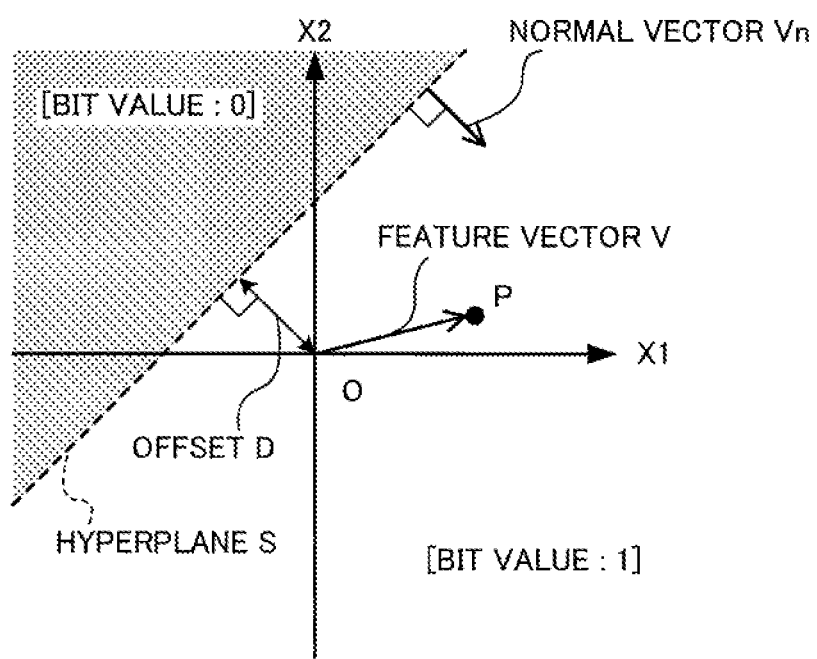
FIG. 6 is a view for explaining a method of generating binary data according to the second embodiment.

As example, binary data is generated from a feature vector according to the method depicted in FIG. 6. FIG. 6 is a view for explaining a method of generating binary data according to the second embodiment. Note that although a two-dimensional feature space defined by an X1 axis and an X2 axis is described as an example here for ease of explanation, in reality a hyperplane is defined in a feature space with a suitable number of dimensions in keeping with the number of dimensions of the feature vector, with the elements in the binary data being decided from the feature vector.

As depicted in FIG. 6, the hyperplane S is defined by the normal vector Vn and the offset D. The normal vector Vn is a vector that is perpendicular to the hyperplane S in the feature space. The offset D is the distance (Euclidean distance) between the origin O of the feature space and the hyperplane S. The hyperplane S divides the feature space into two partial spaces.

When a feature vector V is provided, it is possible to specify in which of the partial spaces a feature point P designated by the feature vector is positioned. In the example in FIG. 6, a bit value "0" is assigned to the partial space that is diagonally shaded and the bit value "1" is assigned to the other partial space. In this example, the feature point P is positioned in the partial space to which the bit value 1 is assigned. Here, for the hyperplane S, the element (bit value) of the binary data corresponding to the feature vector V is set at 1.

As described above, information relating to a plurality of hyperplanes is included in the hyperplane information 101a. For this reason, a bit value with the same number of bits as the number of hyperplanes is obtained for one feature vector using the method depicted in FIG. 6. As one example, when n hyperplanes for calculating the symmetric component are set, n-bit binary data (for calculating the symmetric component) is obtained from one feature vector. Likewise, when m hyperplanes for calculating the antisymmetric component are set, m-bit binary data (for calculating the antisymmetric component) is obtained from the same feature vector. The binary data is generated from the feature vector using the method described above.

The method described above is formulated as indicated below.

When the feature vector is expressed as "V", the normal vector as "Vn", and the offset as "D", the equation for the hyperplane S is given by Expression (4) below. Note that V and Vn are vector values and D is a scalar value. The symbol "·" expresses an inner product. When the bit value obtained from the feature vector V using the hyperplane S is expressed as bS(V), the bit value bS(V) is given by Expression (5) below. When k hyperplanes S1, S2, . . . Sk are provided, the binary data (bit string) b(V) corresponding to the feature vector V is given by Expression (6) below.

$$V \cdot Vn + D = 0 \quad (4)$$

$$bS(V) = \begin{cases} 1 & \text{if } V \cdot Vn + d > 0 \\ 0 & \text{otherwise} \end{cases} \quad (5)$$

$$b(V) = \{bS1(V), bS2(V), \ldots, bSn(V)\} \quad (6)$$

Returning to FIG. 3, the binary data generating unit 102 receives input of a feature vector (or "query") from an input apparatus 200. As one example, the input apparatus 200 is an apparatus that collects image data such as a fingerprint or a vein pattern for authentication purposes and extracts a feature vector from the collected image data. An ATM (Automatic Teller Machine) or an entry and exit management system equipped with a biometric authentication function is an example of the input apparatus 200. Note that the input apparatus 200 may be integrated with the information processing apparatus 100.

The binary data generating unit 102 uses the hyperplane information 101a (see FIG. 4) to generate binary data from the feature vector that has been inputted (see FIG. 6). When doing so, the binary data generating unit 102 generates the binary data (for calculating the symmetric component) using a set of hyperplanes set for calculating the symmetric component and generates the binary data (for calculating the antisymmetric component) using a set of hyperplanes set for calculating the antisymmetric component.

The binary data for calculating the symmetric component generated by the binary data generating unit 102 is inputted into the symmetric component calculating unit 103. The binary data for calculating the antisymmetric component generated by the binary data generating unit 102 is inputted into the antisymmetric component calculating unit 104. In the following description, for ease of explanation, the binary data that has been generated by the binary data generating unit 102 may be referred to as the "binary data (query)".

The symmetric component calculating unit 103 calculates the degree of dissimilarity (the symmetric component) between the binary data (query) for calculating the symmetric component and binary data for calculating the symmetric component included in the registered information 101b (see FIG. 5). The antisymmetric component calculating unit 104 also calculates the degree of dissimilarity (the antisymmetric component) between the binary data (query) for calculating the antisymmetric component and the binary data (query) for calculating antisymmetric component included in the registered information 101b. In the following description, for ease of explanation, the binary data included in the registered information 101b may be referred to as "binary data (records)".

The degrees of dissimilarity (symmetric component, antisymmetric component) calculated by the symmetric component calculating unit 103 and the antisymmetric component calculating unit 104 are inputted into the similarity determining unit 105. The similarity determining unit 105 calculates a degree of dissimilarity (i.e., the sum of the components) in which the symmetric component and the antisymmetric component are integrated. The symmetric component calculating unit 103, the antisymmetric component calculating unit 104, and the similarity determining unit 105 execute the computation relating to degree of dissimilarity described above for each data ID registered in the registered information 101b.

The similarity determining unit 105 specifies a predetermined number of binary data (records) in ascending order of the integrated degree of dissimilarity and extracts data IDs corresponding to the specified binary data (records). The similarity determining unit 105 then calculates the degree of similarity between the respective feature vectors corresponding to the extracted data IDs and the feature vector received from the input apparatus 200 and specifies the data ID corresponding to the feature vector with the highest similarity.

The similarity determining unit 105 outputs the specified data ID to an output apparatus 300. The output apparatus 300 is a display apparatus or another information processing apparatus that executes processing based on the data ID outputted from the similarity determining unit 105. Note that the output apparatus 300 may be integrated with the input apparatus 200 or may be integrated with the information processing apparatus 100.

Figure 7:
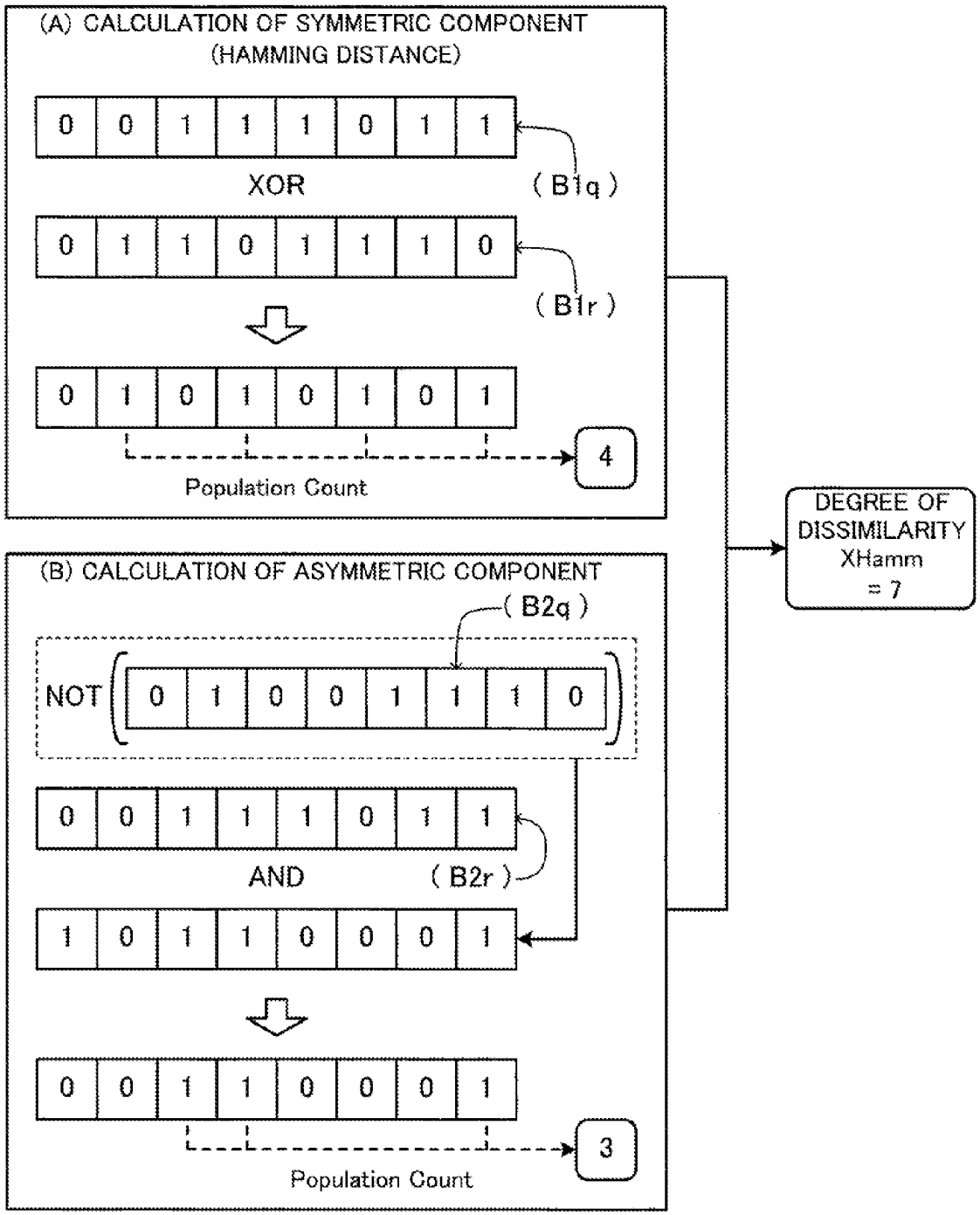
FIG. 7 is a view for explaining a method of calculating a degree of dissimilarity according to the second embodiment.

Here, calculation of the degree of dissimilarity by the symmetric component calculating unit 103, the antisymmetric component calculating unit 104, and the similarity determining unit 105 will be described further with reference to FIG. 7. FIG. 7 is a view for explaining a method of calculating the degree of dissimilarity according to the second embodiment.

In the example in the block labeled (A) in FIG. 7, the method of calculating the degree of dissimilarity (the symmetric component) between a bit string $B1q$ ($B1q$=00111011) as the binary data (query) and a bit string $B1r$ ($B1r$=01101110) as the binary data (record) is depicted.

As depicted in block (A) in FIG. 7, the symmetric component calculating unit 103 performs an exclusive OR (XOR) operation on the two bit strings $B1q$ and $B1r$ and counts the number of ones included in the calculation result (01010101). This counting operation is called a "Population Count". In the example in block (A) in FIG. 7, the number of ones included in the result of the XOR calculation is four. This number is symmetric component Hamm($B1q$,$B1r$) of the degree of dissimilarity.

As described above, the symmetric component Hamm($B1q$,$B1r$) (Hamming distance) of the degree of dissimilarity exhibits "symmetry" whereby the result does not change when the bit strings $B1q$, $B1r$ are interchanged. That is, when Hamm($\cdot$, $\cdot$) is set as a function that expresses the calculation depicted in block (A) in FIG. 7, Hamm($B1q$,$B1r$)=Hamm($B1r$,$B1q$) is satisfied.

In the example in block (B) in FIG. 7, the method of calculating the degree of dissimilarity (antisymmetric component) between a bit string $B2q$ ($B2q$=01001110) as the binary data (query) and a bit string $B2r$ ($B2r$=00111011) as the binary data (record) is depicted.

As depicted in block (B) in FIG. 7, the antisymmetric component calculating unit 104 inverts (NOT) the bit string $B2q$ to calculate an inverted value (10110001). The antisymmetric component calculating unit 104 then performs a logical AND operation on the calculated inverted value and the bit string $B2r$ and counts the number of ones ("Population Count") included in the calculation result (00110001). In the example in block (B) in FIG. 7, the number of ones included in the result of the AND operation is three. This number is the antisymmetric component QHamm($B2q$,$B2r$) of the degree of dissimilarity.

Unlike Hamm($\cdot$, $\cdot$) described earlier, the antisymmetric component QHamm($B2q$,$B2r$) of the degree of dissimilarity is "antisymmetric" in that the result may change when the bit strings $B2q$ and $B2r$ are interchanged. That is, when QHamm($\cdot$, $\cdot$) is the function expressed by the operations depicted in block (B) in FIG. 7, the condition QHamm($B2q$,$B2r$)$\neq$QHamm($B2r$,$B2q$) is satisfied (since QHamm($B2r$,$B2q$)=1).

The similarity determining unit 105 adds the symmetric component Hamm($B1q$,$B1r$) of the degree of dissimilarity calculated by the symmetric component calculating unit 103 and the antisymmetric component QHamm($B2q$,$B2r$) of the degree of dissimilarity calculated by the antisymmetric component calculating unit 104 and sets the addition result as the combined dissimilarity XHamm. For the example in FIG. 7, XHamm is 7.

Note that $B1q$, $B1r$, $B2q$, and $B2r$ are binary data strings obtained from the same feature vector. The symmetric component calculating unit 103, the antisymmetric component calculating unit 104, and the similarity determining unit 105 execute the computation of dissimilarity XHamm depicted in FIG. 7 for the respective binary data strings obtained from the same feature vector using a plurality of hyperplanes.

Characteristics of Antisymmetric Component

Figure 8:
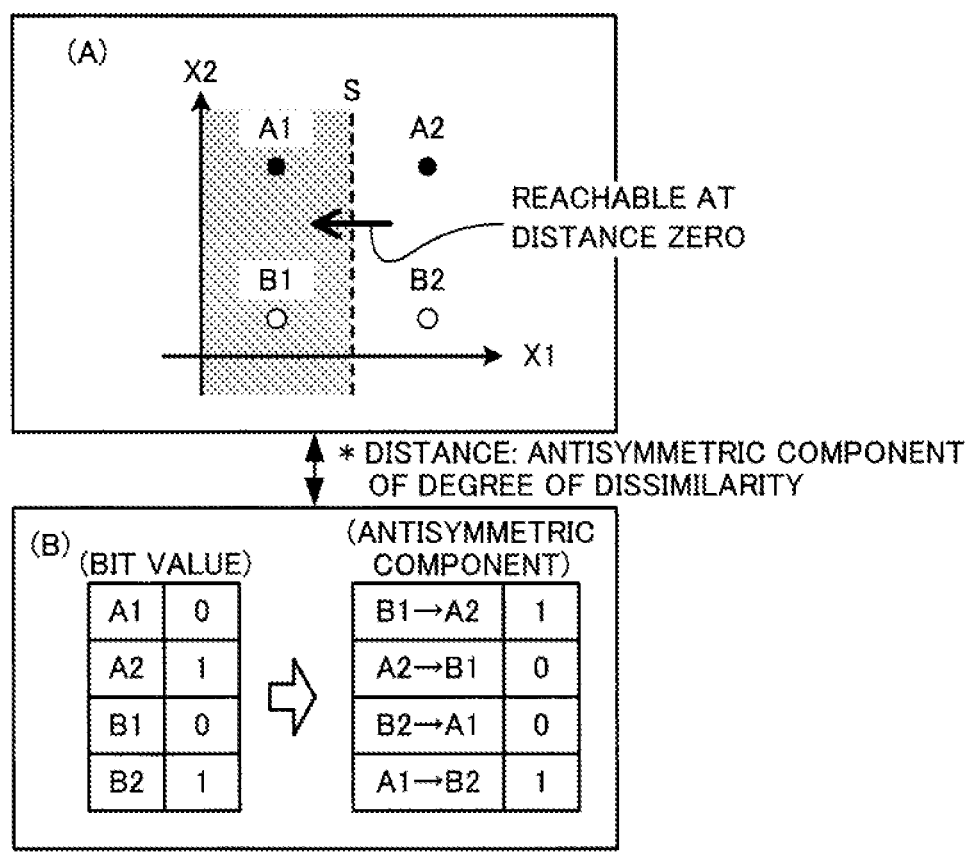
FIG. 8 is a view for explaining a method of interpreting the characteristics of an antisymmetric component of the degree of dissimilarity based on the unidirectionality of a hyperplane according to the second embodiment.

Here, the characteristics (antisymmetry) of the antisymmetric component of the degree of dissimilarity will be described further with reference to FIG. 8. FIG. 8 is a view for explaining a method of interpreting the characteristics of the antisymmetric component of the degree of dissimilarity based on the unidirectionality of a hyperplane according to the second embodiment.

As depicted in block (A) in FIG. 8, when four feature points A1, A2, B1, and B2 and a hyperplane S are given for a feature space defined by X1 and X2 axes, the feature points A1 and B1 on the left of the hyperplane S are associated with the bit value "0" and the feature points A2 and B2 on the right of the hyperplane S are associated with the bit value "1".

When the symmetric component of the degree of dissimilarity is set as "distance", the distance (B1 XOR A2) between the feature points B1 and A2 is "1" and the distance (A1 XOR B2) between the feature points A1 and B2 is also "1". That is, when crossing the hyperplane S between feature points, it is interpreted that a movement cost of the distance 1 is incurred. The movement cost does not change depending on the direction in which the hyperplane S is crossed.

On the other hand, when the antisymmetric component of the degree of dissimilarity is set as "distance", the distance (NOT(B1) AND A2) when moving from the feature point B1 to the feature point A2 is "1" but the distance (NOT(A2) AND B1) when moving from the feature point A2 to the feature point B1 is "0". In the same way, the distance (NOT(B2) AND A1) when moving from the feature point B2 to the feature point A1 is "0" and the distance (NOT(A1) AND B2) when moving from the feature point A1 to the feature point B2 is "1". That is, it is possible to interpret that although the movement cost when moving from the right side to the left side of the hyperplane S is "0", the movement cost when moving in the opposite direction is "1".

As described above, it can be understood that the antisymmetric component QHamm of the degree of dissimilarity exhibits unidirectionality for the hyperplane S (a property whereby the direction in which it is possible to move a distance of zero is limited). As examples, this unidirectionality is useful in expressing the gravity-related difference in the work involved when moving up and down a slope, or the difference in energy taken to advance the same distance between moving with a tailwind and moving into a headwind. In the second embodiment, the difference between a feature vector that is easily affected by differences in the collection environment for unstructured data and a feature vector that is largely unaffected is represented by the concept of unidirectionality described above.

Method of Deciding Hyperplanes through Learning

Figure 9:
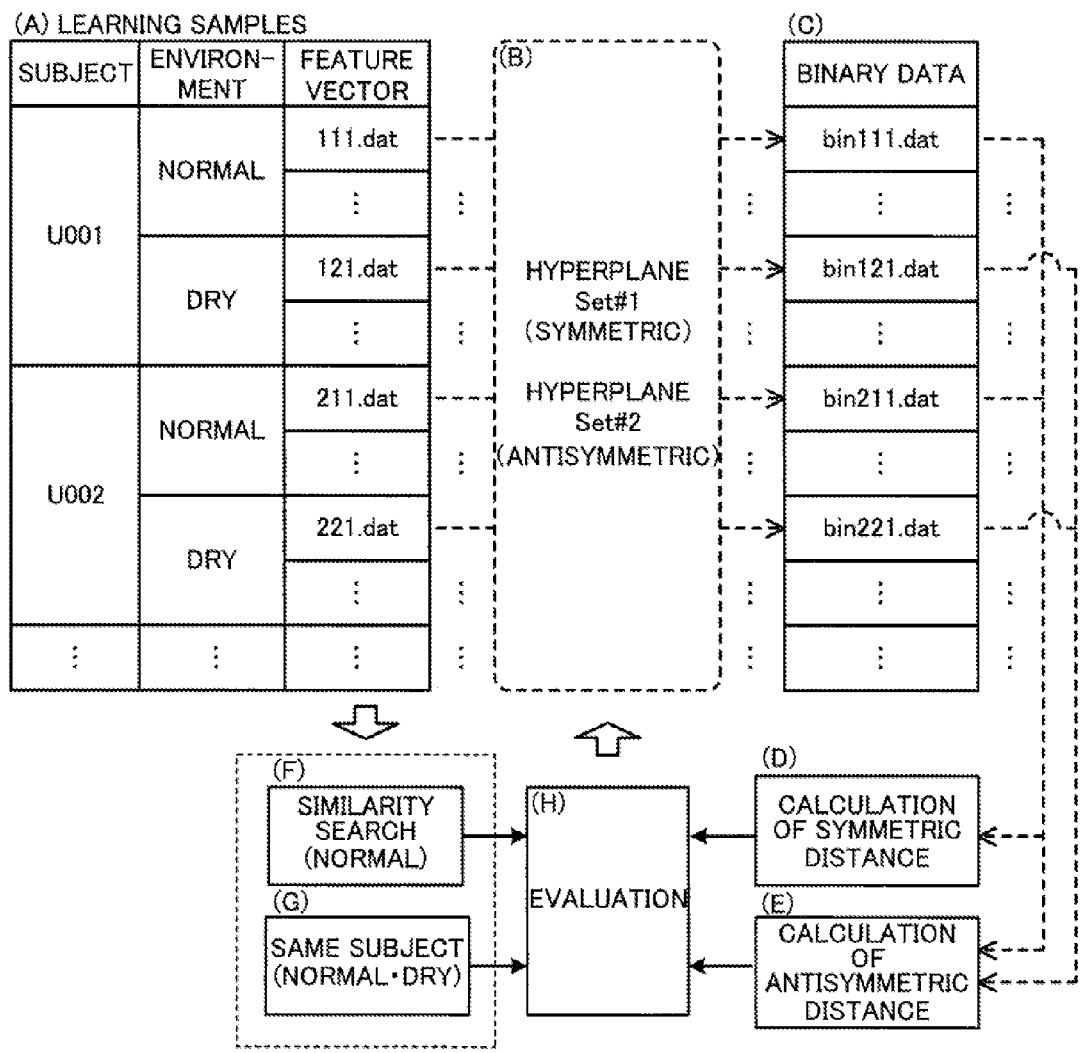
FIG. 9 is a view for explaining a method of deciding hyperplanes according to the second embodiment.

Here, a method of deciding hyperplanes according to the second embodiment will be described with reference to FIG. 9. FIG. 9 is a view for explaining a method of deciding hyperplanes according to the second embodiment.

In the example in FIG. 9, as a method of reflecting the influence of the collection environment on the unidirectionality of a hyperplane, a method is disclosed that uses the antisymmetric component QHamm of the degree of dissimilarity to decide, through learning, a set of hyperplanes to be used when generating binary data based on samples of unstructured data obtained in different collection environments. Note that in the example in FIG. 9, the method of deciding the set of hyperplanes to be used when generating binary data for the symmetric component is also depicted. In the following description, the set of hyperplanes relating to the symmetric component is indicated as the "hyperplane Set#1" and the set of hyperplanes relating to the antisymmetric component is indicated as the "hyperplane Set#2".

When deciding the hyperplane Set#1 and hyperplane Set#2, as depicted in FIG. 9A, feature vectors obtained from a large number of unstructured data collected in different environments are used as samples for learning. As one example, for unstructured data, such as fingerprint data, that depends on humidity conditions, feature vectors relating to unstructured data collected in conditions with normal humidity (where environment="normal") and unstructured data collected in a dry state (where environment="dry") are used.

(A) A plurality of sets of unstructured data are collected in different environments from the same subject and feature vectors are extracted from the respective unstructured data.

(B,C) Feature vectors corresponding to the normal environment are converted to binary data using hyperplane Set#1 that is initially set. Feature vectors corresponding to the normal environment are also converted to binary data using hyperplane Set#2 that is initially set. Feature vectors corresponding to the dry environment are also converted to binary data using the same hyperplane Set#2.

(D) The symmetric component Hamm (symmetrical distance) of the degree of dissimilarity is calculated from the binary data converted using the hyperplane Set#1 and a group of feature vectors positioned in the neighborhood of a given feature vector is specified based on the symmetric distance (neighborhood search).

(F) On the other hand, a neighborhood search is also performed based on the degree of dissimilarity in the feature space for the feature vectors corresponding to the normal environment.

(H) Evaluation of whether the result of the neighborhood search in (D) above and the result of the neighborhood search in (F) above match within a tolerated range is performed, and the hyperplane Set#1 is updated based on the evaluation result.

(E) Out of the binary data converted using the hyperplane Set#2, the antisymmetric component QHamm (antisymmetric distance) of the degree of dissimilarity between the binary data corresponding to the normal environment and the binary data corresponding to the dry environment is calculated. When doing so, the binary data corresponding to the dry environment is inputted into the first input value Bq of QHamm (Bq,Br) and binary data corresponding to the normal environment is inputted into the second input value Br of QHamm (Bq,Br). That is, specified environments are respectively set in the first input value and the second input value.

(G) Meanwhile, information indicating a pair of feature vectors corresponding to unstructured data provided from the same subject in the normal environment and the dry environment are specified.

(H) After this, the hyperplane Set#2 is evaluated using an evaluation standard that gives a higher evaluation the smaller the antisymmetric distance between binary data strings corresponding to the same subject and the larger the antisymmetric distance between the binary data strings corresponding to different subjects. The hyperplane Set#2 is then updated in keeping with the evaluation result.

Note that as one example, evaluation of the hyperplane Set#1 is performed according to a criterion of whether the result of the neighborhood search in (F) described above and the result of the neighborhood search based on the symmetric distance in (D) described above match for a predetermined number (N) of feature vectors that are close to a given feature vector. On the other hand, the evaluation of the hyperplane Set#2 is performed according to a criterion of whether binary data corresponding to a different subject is not present in a range where the antisymmetric distance in (E) described above is a threshold Th or shorter. By repeatedly executing the processing from (B) to (H) described above while updating the hyperplane Set#1 and the hyperplane Set#2, a combination of hyperplanes that is favorable for generating the binary data described earlier is obtained.

This completes the description of the functions of the information processing apparatus 100.

2-3. Processing Flow

Next, the processing flow of a registration process for binary data and a search process for feature vectors (records) that are similar to a feature vector (query) of unstructured data that has been inputted will be described.

Registration Process

Figure 10:
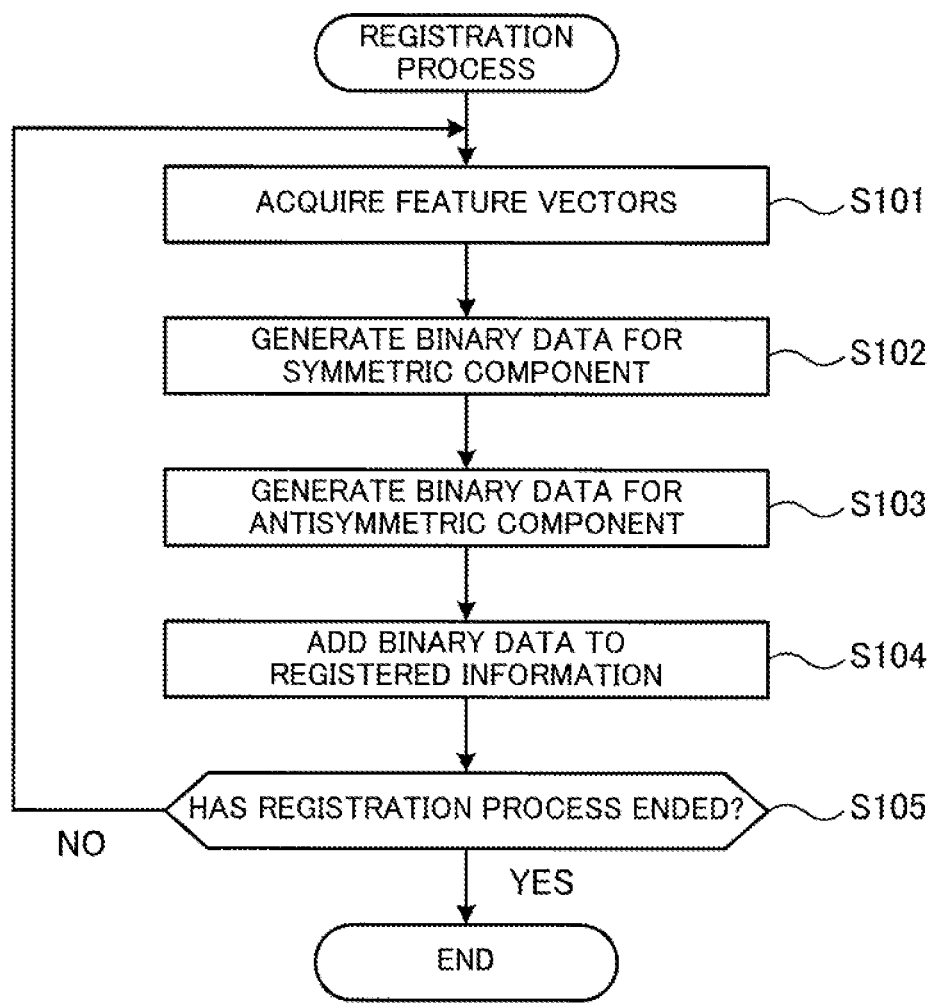
FIG. 10 is a flowchart depicting a registration process according to the second embodiment.

First, the flow of the registration process for binary data will be described with reference to FIG. 10. FIG. 10 is a flowchart depicting the registration process according to the second embodiment.

(S101) The binary data generating unit 102 acquires a feature vector to be registered in the registered information 101b (see FIG. 5) from the input apparatus 200.

(S102) The binary data generating unit 102 refers to the hyperplane information 101a (see FIG. 4) and uses the information on the normal vectors and the offsets relating to the hyperplanes for the symmetric component to generate the binary data B1r from the feature vector acquired in S101 (see FIG. 6).

Note that if the feature vector is expressed as "V", the normal vector as "Vn", and the offset as "D", the equation for a hyperplane S is given by Expression (4) given above. Also, if the bit value obtained from the feature vector V using the hyperplane S is expressed as bS(V), the bit value bS(V) is given by Expression (5) given above. When the hyperplanes S1, S2, . . . , Sn are given, the binary data b(V) corresponding to the feature vector V is given by Expression (6) given above.

(S103) The binary data generating unit 102 refers to the hyperplane information 101a and uses the information on the normal vectors and the offsets relating to the hyperplanes for calculating the antisymmetric component to generate the binary data B2r from the feature vector acquired in S101 (see FIG. 6).

(S104) The binary data generating unit 102 adds the binary data for the symmetric component generated in S102 and the binary data for the antisymmetric component generated in S103 to the registered information 101b. At this time, the binary data generating unit 102 adds the information to the registered information 101b so that a data ID indicating the original data of the feature vector acquired in S101, the corresponding feature vector, and the binary data generated in S102 and S103 are associated.

(S105) The binary data generating unit 102 determines whether to end the registration process. When the processing of feature vectors to be registered has been completed and the registration process ends, the series of processes depicted in FIG. 10 ends. On the other hand, when there is still an unregistered feature vector, the processing proceeds to S101.

Search Process

Figure 11:
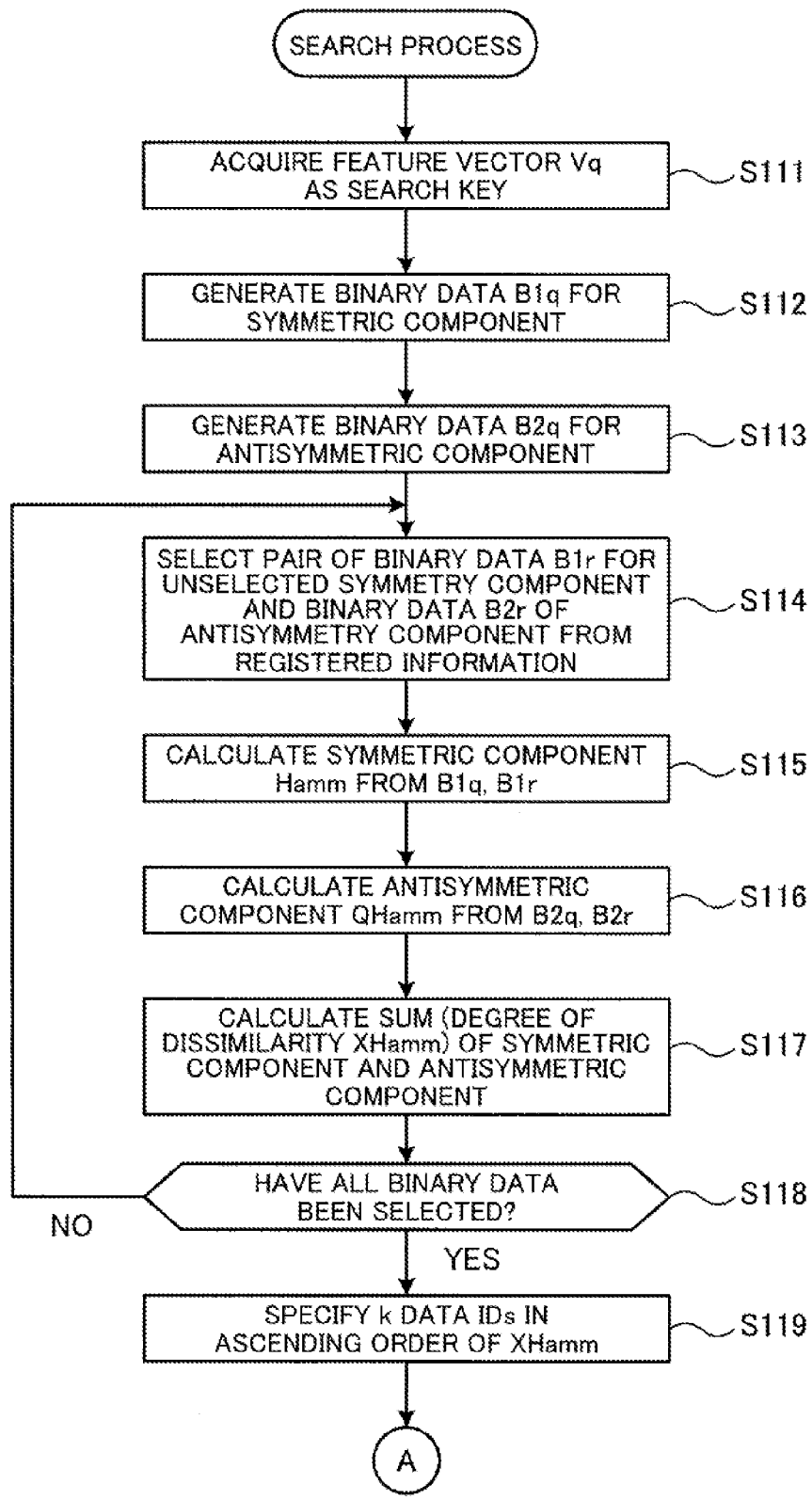
FIG. 11 is a first flowchart depicting the flow of a search process according to the second embodiment.
Figure 12:
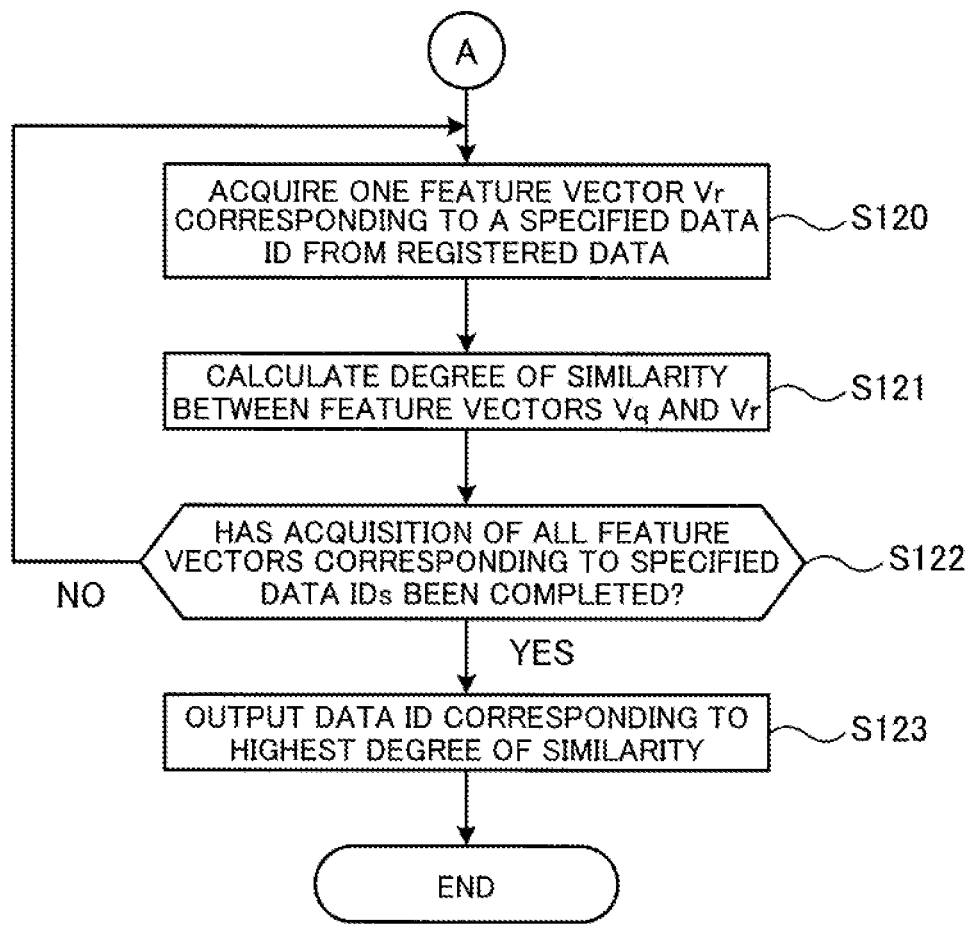
FIG. 12 is a second flowchart depicting the flow of a search process according to the second embodiment.

Next, the flow of a search process will be described with reference to FIGS. 11 and 12. FIG. 11 is a first flowchart depicting the flow of a search process according to the second embodiment. FIG. 12 is a second flowchart depicting the flow of a search process according to the second embodiment.

(S111) The binary data generating unit 102 acquires a feature vector Vq (query) to be used as a search key from the input apparatus 200.

(S112) The binary data generating unit 102 refers to the hyperplane information 101a (see FIG. 4) and uses the information on the normal vectors and offsets relating to the hyperplanes for the symmetric component to generate the binary data B1q from the feature vector Vq acquired in S111 (see FIG. 6).

(S113) The binary data generating unit 102 refers to the hyperplane information 101a and uses the information on the normal vectors and offsets relating to the hyperplanes for the antisymmetric component to generate the binary data B2q from the feature vector Vq acquired in S111 (see FIG. 6).

(S114) The symmetric component calculating unit 103 and the antisymmetric component calculating unit 104 select a pair of unselected binary data B1r and B2r out of the sets of binary data B1r and B2r registered in the registered information 101b.

(S115) The symmetric component calculating unit 103 calculates the degree of dissimilarity Hamm (B1q,B1r) (the symmetric component: see FIG. 7A) between the binary data B1q generated in S112 and the binary data B1r selected in S114.

(S116) The antisymmetric component calculating unit 104 calculates the degree of dissimilarity QHamm (B2q, B2r) (the antisymmetric component: see FIG. 7B) between the binary data B2q generated in S113 and the binary data B2r selected in S114.

(S117) The similarity determining unit 105 calculates the sum (the degree of dissimilarity XHamm) of the symmetric component calculated in S115 and the antisymmetric component calculated in S116.

(S118) The similarity determining unit 105 determines whether all of the binary data B1r and B2r has been selected. When the selecting of all the binary data B1r and B2r has been completed, the processing proceeds to S119. On the other hand, when there is unselected binary data B1r and B2r, the processing returns to S114.

(S119) The similarity determining unit 105 specifies k (where k is a specified number of one or higher) data IDs in ascending order of the degree of dissimilarity XHamm. That is, the similarity determining unit 105 refers to the registered information 101b and specifies k data ID corresponding to binary B1r and B2r extracted in ascending order of the degree of dissimilarity XHamm.

(S120) The similarity determining unit 105 acquires one feature vector Vr corresponding to the data ID specified in S119 from the registered information 101b.

(S121) The similarity determining unit 105 calculates the degree of similarity between the feature vectors Vq and Vr.

(S122) The similarity determining unit 105 determines whether every feature vector corresponding to every data ID specified in S119 has been acquired. When the feature vectors corresponding to every data ID have been acquired, the processing proceeds to S123. On the other hand, when there is a feature vector yet to be acquired, the processing returns to S120.

(S123) The similarity determining unit 105 specifies the highest degree of similarity out of the degrees of similarity calculated in S121 and outputs the data ID corresponding to the highest degree of similarity to the output apparatus 300.

When the processing in S123 is completed, the series of processes depicted in FIGS. 11 and 12 ends.

This completes the description of the flow of processing executed by the information processing apparatus 100.

As described above, reflecting the influence of changes in environment in the unidirectionality of hyperplanes enables reflecting the influence of changes in environment on a similarity search through evaluation of the degree of dissimilarity that exhibits antisymmetry, and thus it is possible to suppress search errors due to changes in environment.

This completes the description of the second embodiment.

According to the embodiments, it is possible to improve the precision of a similarity search.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
    a memory that stores therein first registered feature datasets respectively expressing a first feature of registered datasets and second registered feature datasets respectively expressing a second feature of the registered datasets; and
    a processor configured to perform a procedure including:
    receiving a subject dataset which is input to the information processing apparatus;
    generating a first subject feature dataset expressing the first feature of the subject dataset and a second subject feature dataset expressing the second feature of the subject dataset;
    calculating a first degree of dissimilarity that is a degree of dissimilarity between each of the first registered feature datasets and the first subject feature dataset using a first computational process that calculates a degree of dissimilarity between two input values and exhibits symmetry so that a computational result does not change when the two input values are interchanged;
    calculating a second degree of dissimilarity that is a degree of dissimilarity between each of the second registered feature datasets and the second subject feature dataset using a second computational process that calculates a degree of dissimilarity between two input values and exhibits antisymmetry so that a computational result changes when the two input values are interchanged; and
    selecting a first registered dataset from the registered datasets based on the first degree of dissimilarity and the second degree of dissimilarity, the first registered dataset being similar to the subject dataset.

2. The information processing apparatus according to claim 1, wherein the processor determines that a degree of similarity between the subject dataset and each of the registered datasets is higher the smaller a sum of the first degree of dissimilarity and the second degree of dissimilarity.

3. The information processing apparatus according to claim 1,
    wherein the first registered feature datasets, the second registered feature datasets, the first subject feature dataset, and the second subject feature dataset are bit strings,
    the first computational process is a computational process that counts a number of ones included in a result of a logical exclusive OR between one input value out of the two input values and another input value, and
    the second computational process is a computational process that counts a number of ones included in a result of a logical AND between one input value out of the two input values and an inverted value produced by inverting another input value.

4. The information processing apparatus according to claim 1,
    wherein the first feature is a feature where, for a first dataset and a second dataset collected in a same environment, the higher a degree of similarity between the first feature of the first dataset and the first feature of the second dataset when the first dataset and the second dataset are compared, the lower the first degree of dissimilarity, and
    the second feature is a feature where, for a third dataset and a fourth dataset collected in different environments, the higher a degree of similarity between the second feature of the third dataset and the second feature of the fourth dataset when the third dataset and the fourth dataset are compared, the lower the second degree of dissimilarity.

5. A method of searching for similar data using a computer including a memory and a processor, comprising:
    acquiring, by the processor, first registered feature datasets respectively expressing a first feature of registered datasets and second registered feature datasets respectively expressing a second feature of the registered datasets from the memory;
    receiving, by the processor, a subject dataset which is input to the computer;
    generating, by the processor, a first subject feature dataset expressing the first feature of the subject dataset and a second subject feature dataset expressing the second feature of the subject dataset;
    calculating, by the processor, a first degree of dissimilarity between each of the first registered feature datasets and the first subject feature dataset using a first computational process that calculates a degree of dissimilarity between two input values and exhibits symmetry so that a computational result does not change when the two input values are interchanged;
    calculating, by the processor, a second degree of dissimilarity between each of the second registered feature datasets and the second subject feature dataset using a second computational process that calculates a degree of dissimilarity between two input values and exhibits antisymmetry so that a computational result changes when the two input values are interchanged; and
    selecting, by the processor, a first registered dataset from the registered datasets based on the first degree of dissimilarity and the second degree of dissimilarity, the first registered dataset being similar to the subject dataset.

6. A non-transitory computer-readable storage medium storing a similar data search program that causes a computer including a memory and a processor to perform a procedure comprising:
    acquiring, by the processor, first registered feature datasets respectively expressing a first feature of registered datasets and second registered feature datasets respectively expressing a second feature of the registered datasets from the memory;

receiving, by the processor, a subject dataset which is input to the computer;

generating, by the processor, a first subject feature dataset expressing the first feature of subject datasets and a second subject feature dataset expressing the second feature of the subject datasets;

calculating, by the processor, a first degree of dissimilarity between each of the first registered feature datasets and the first subject feature dataset using a first computational process that calculates a degree of dissimilarity between two input values and exhibits symmetry so that a computational result does not change when the two input values are interchanged;

calculating, by the processor, a second degree of dissimilarity between each of the second registered feature datasets and the second subject feature dataset using a second computational process that calculates a degree of dissimilarity between two input values and exhibits antisymmetry so that a computational result changes when the two input values are interchanged; and selecting, by the processor, a first registered dataset from the registered datasets based on the first degree of dissimilarity and the second degree of dissimilarity, the first registered dataset being similar to the subject dataset.

* * * * *